United States Patent [19]

Sih

[11] Patent Number: 5,592,548
[45] Date of Patent: Jan. 7, 1997

[54] SYSTEM AND METHOD FOR AVOIDING FALSE CONVERGENCE IN THE PRESENCE OF TONES IN A TIME-DOMAIN ECHO CANCELLATION PROCESS

[75] Inventor: Gilbert C. Sih, San Diego, Calif.

[73] Assignee: QUALCOMM Incorporated, San Diego, Calif.

[21] Appl. No.: 455,801

[22] Filed: May 31, 1995

[51] Int. Cl.⁶ .............................. H04B 3/23; H04M 9/08
[52] U.S. Cl. .............................. 379/410; 379/407; 379/3; 379/386
[58] Field of Search .................... 379/410, 411, 379/407, 3, 386, 372; 370/32.1

[56] References Cited

U.S. PATENT DOCUMENTS

| | | | |
|---|---|---|---|
| 4,633,046 | 12/1986 | Kitayama et al. | 379/411 X |
| 4,823,382 | 4/1989 | Martinez | 379/411 |
| 4,912,758 | 3/1990 | Arbel | 379/411 X |
| 4,918,727 | 4/1990 | Rohrs et al. | 379/410 |
| 4,998,241 | 5/1991 | Brox et al. | 379/411 X |
| 5,247,512 | 9/1993 | Sugaya et al. | 379/410 X |
| 5,263,020 | 11/1993 | Yatsuzuka et al. | 379/410 X |
| 5,295,136 | 3/1994 | Ashley et al. | 379/411 X |
| 5,307,405 | 4/1994 | Sih | 379/410 |
| 5,319,702 | 6/1994 | Kitchin et al. | 379/386 X |
| 5,343,521 | 8/1994 | Jullien et al. | 379/410 |
| 5,351,291 | 9/1994 | Menez et al. | 379/410 |
| 5,390,244 | 2/1995 | Hinman et al. | 379/386 |
| 5,428,681 | 6/1995 | Andre | 379/410 X |
| 5,455,819 | 10/1995 | Sugiyama | 370/32.1 X |
| 5,546,459 | 8/1996 | Sih et al. | 379/411 |

FOREIGN PATENT DOCUMENTS

| | | |
|---|---|---|
| 3-171810 | 7/1991 | Japan . |
| 2095519 | 9/1982 | United Kingdom ................... 379/410 |

Primary Examiner—Ahmad F. Matar
Assistant Examiner—T. Devendra Kumar
Attorney, Agent, or Firm—Russell B. Miller; Katherine W. White; Sean English

[57] ABSTRACT

A system and method for detecting convergence in an echo canceller prevent false convergence from occurring as a result of receiving only tones in an input signal. An adaptive filter is used in an echo canceller to estimate an echo signal produced by an unknown echo channel. The estimated echo signal is subtracted from the return signal to remove the echo produced by the unknown echo channel. To prevent the echo canceller from falsely converging on a signal which contains only tones a system and method are provided for detecting the presence of tones in the absence of other frequencies. Filter taps of the adaptive filter are filtered to produce a filtered signal. The amount of energy in the filtered signal is compared to the amount of energy in the unfiltered filter taps to determine whether only tones have been present. If only tones have been present, the echo canceller is not allowed to reduce the adaptation step size of the adaptive filter.

22 Claims, 3 Drawing Sheets

SYSTEM AND METHOD FOR AVOIDING FALSE CONVERGENCE IN THE PRESENCE OF TONES IN A TIME-DOMAIN ECHO CANCELLATION PROCESS

BACKGROUND OF THE INVENTION

I. Field of the Invention

The present invention relates generally to echo cancellers, and more specifically to a system and method for avoiding false convergence due to the presence of tone in time-domain echo cancellation.

II. Description of the Related Art

It is common in conventional land-based telephone systems to connect subscriber equipment to a central office using a two-wire line (often called the customer or subscriber loop). However, for equipment separated from the central office by distances greater than 35 miles, the two directions of transmission are separated onto physically separate wires. This is referred to as a four-wire line. Thus, when one of the parties to a call is located at a great distance from the central office (e.g., when a subscriber makes or receives a long-distance call), the central office must connect a two-wire line to a four-wire line. The device used to make this connection is called a hybrid. Thus, a typical long-distance telephone circuit can be described as two-wire in the subscriber loop to the local hybrid at the central office, four-wire over the long-distance network to the distant hybrid at the distant central office, and two-wire from the distant hybrid to the distant party.

One consequence of using hybrids to connect four-wire lines to two-wire lines is impedance mismatch. As a result of impedance mismatch at the hybrid, the speech of a speaker at one end, may be reflected off the hybrid at the other end (the distant hybrid). The reflection causes the speaker to hear an annoying echo of his own voice. Over relatively short distances, where the echo temporally coincides with the actual speech, the echo is not noticeable. However, over longer distances, the delay between the actual speech and the received echo is greater, resulting in a noticeable echo. To minimize the undesirable effects of such echoes, echo cancellers have been employed in various forms.

One form of echo canceller is described in U.S. Pat. No. 5,307,405, entitled "Network Echo Canceller" issued Apr. 26, 1994 and assigned to the assignee of the present invention. The '405 'patent describes a system in which the impulse response of the unknown echo channel is identified and a replica of the actual echo signal is generated using adaptive filtering techniques. The echo replica is subtracted from the signal heading toward the far-end speaker to cancel the actual echo signal.

Specifically, an adaptive filter at the central office receives a reference signal from the signal received from the speaker at the far end. The adaptive filter uses this reference signal to produce the echo replica which is essentially an estimate of the echo. This estimate is subtracted from the return signal that is heading to the far end, thus canceling the speaker's echo from this signal. The subtraction results in a residual error signal which is used by the adaptive filter to update its taps according to an adaptation algorithm such as the Least-Mean Square (LMS) method. In essence, the adaptive filter learns the frequency response of the unknown channel by observing the response to the frequencies sent out in the far-end signal. In other words, the adaptive filter uses the far-end speech as a reference and adapts its filter taps to accurately filter out the echo signal.

A state machine is provided to control the operation of the echo canceller and to determine when the adaptive filter should be updated. Typically, the adaptation step size of the filter is initially set large so that the filter converges quickly (i.e. so the filter adapts to the channel quickly). Then, once the filter has converged, the step size is made small so the filter remains converged on the channel.

SUMMARY OF THE INVENTION

The present invention is directed toward a system and method for inhibiting false convergence in echo cancellation devices. In a time domain echo canceller, an adaptive filter is used to estimate the echo signal. The estimated echo signal is then subtracted from the return signal so that the speaker at the far end does not hear his own echo. A state machine in the echo canceller controls the adaptation step size of the adaptive filter according to an adaptation algorithm. When the adaptive filter learns the frequency response of the echo channel, the state machine decreases the adaptation step size to converge the echo canceller.

With conventional echo cancellers, the presence of certain tones, such as Dual-Tone Multifrequency (DTMF) tones, in the echo channel can result in false convergence. Specifically, when only tones are present, the adaptive filter rapidly learns the channel response to the tone frequencies and quickly converges to cancel the tones. However, the tone frequencies alone do not represent the whole range of frequencies that may be carried by the channel. Human speech and other audio signals contain a much wider range of frequencies. Therefore, if the echo canceller converges on the channel and the adaptation step size of the filter is reduced when only tones are present, the echo canceller may be unable to immediately cancel echo signals at frequencies other than the tone frequencies when such new frequencies appear on the channel because the small adaptation step size results in a slow response of the adaptive filter to the new frequencies.

To detect and avoid false convergence, a comparator circuit is provided. Because the adaptive filter's tap values (also called filter coefficients) constitute an estimate of the current state of the unknown echo channel, the taps contain information about the frequencies that have been present on the channel. The comparator circuit can be used to analyze the spectral content of the filter tap values to determine whether only tones have been present during the convergence process or whether other audio information such as speech has been present as well. If only tones are present, the comparison circuit inhibits the echo canceller from reducing its adaptation step size so that the step size remains large. With this large adaptation step size, when audio information such as speech appears on the echo channel, the echo canceller can rapidly converge to cancel the echo before it can be heard by the speaker at the far end.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENT

1. Overview and Discussion of the Invention

The present invention is directed toward an improved echo canceller having a comparator circuit for detecting and avoiding false convergence resulting from transmitted tones. According to the invention, a time domain echo canceller includes a comparison circuit that observes an accumulated estimate of the frequency response of the channel to determine whether only tones have been present on the channel. If only tones have been present, the echo canceller is prohibited from reducing its adaptation step size to avoid false convergence.

2. Environment of the Invention

Figure 1:
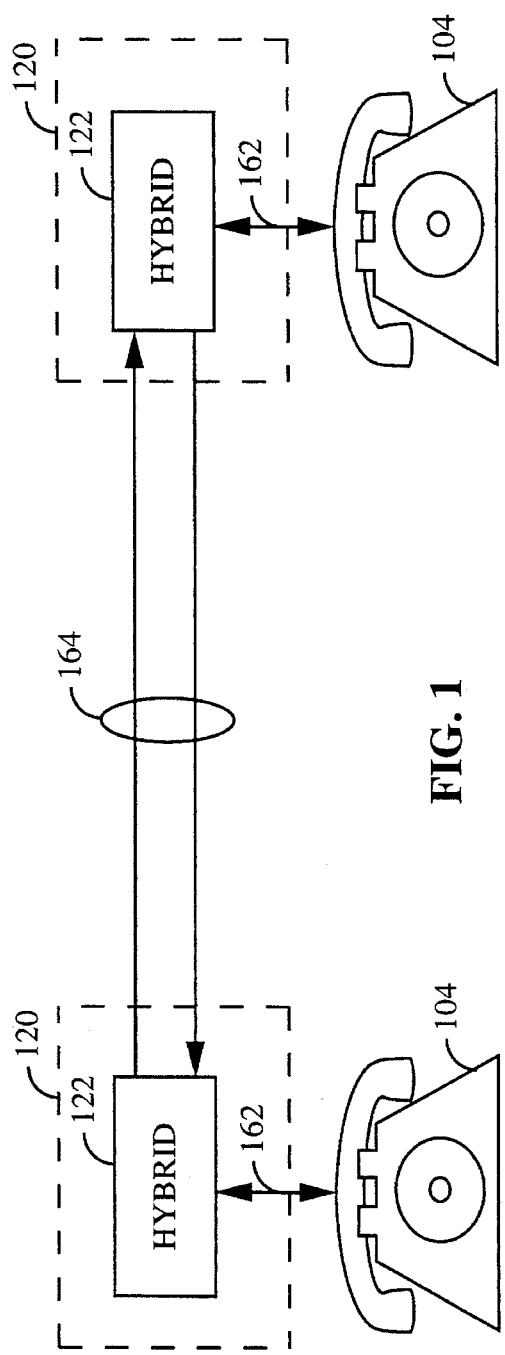
FIG. 1 is a illustrates a long-distance telephone communications system.

Before describing the invention in detail, it is useful to describe an example environment in which the invention may be implemented. As the invention is directed toward improved echo cancellation techniques, the invention is particularly useful in the environment of a long-distance telephone communication system. FIG. 1 illustrates one such environment.

Referring now to FIG. 1, the long-distance communication system is comprised of two telephone instruments 104, each connected to an associated hybrid 122 at an associated central office 120. This connection is made via a two-wire line referred to as a subscriber loop 162. For the communication across the long-distance network from one central office 120 to the other, a connection is made via a long-haul network which is a four-wire segment 164.

Figure 2:
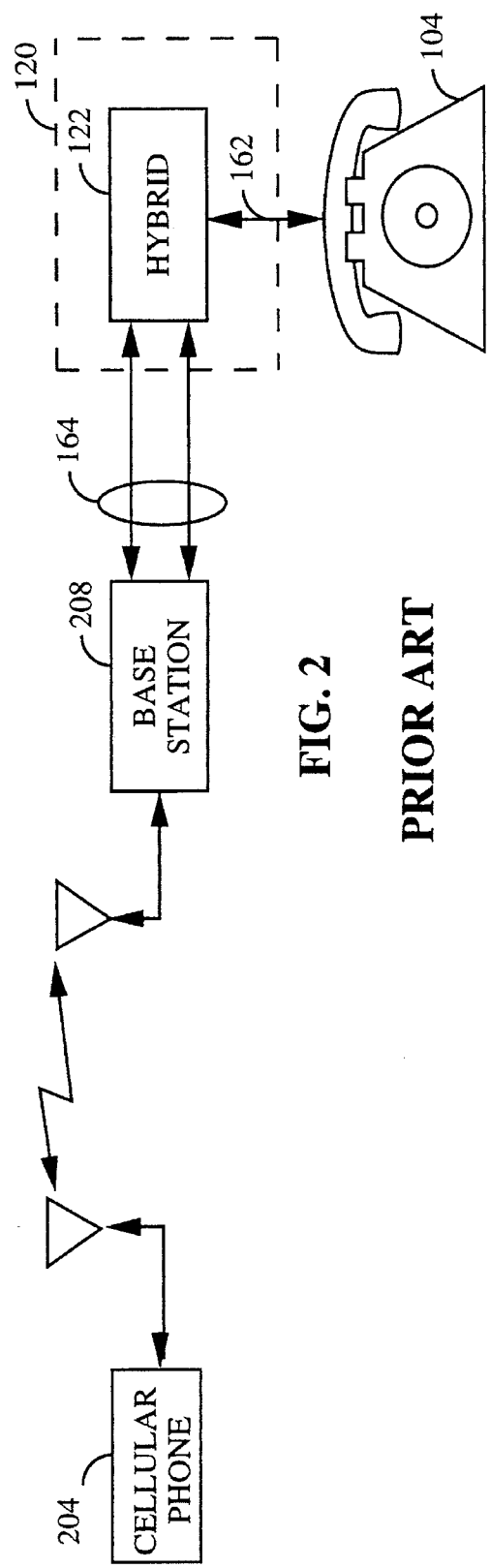
FIG. 2 is a illustrates a cellular telephone communication system.

Another environment in which the invention would be useful is that of the cellular telephone communication circuit. FIG. 2 is a block diagram illustrating a typical cellular telephone communications circuit. The cellular telephone communications circuit includes a cellular phone 204 and a base station 208. Base station 208 interfaces cellular phone 204 to central office 120 to complete a call between telephone instrument 104 and cellular phone 204.

Both of these environments provide a hybrid 122 that interfaces the local two-wire subscriber loop 162 to the four-wire segment 164. As described above, impedance mismatches at hybrid 122 may result in echoes. Due to the delay associated with end-to-end communications in these environments, the resultant echoes may well become an undesirable effect. Therefore, these environments are ideally suited to benefit from an improved echo canceller.

The present invention is described in terms of these example environments. Description in these terms is provided for convenience only. It is not intended that the invention be limited to application in these example environments. In fact, after reading the following description, it will become apparent to a person skilled in the relevant art how to implement the invention in alternative environments.

3. Time-Domain Echo Canceller

Figure 3:
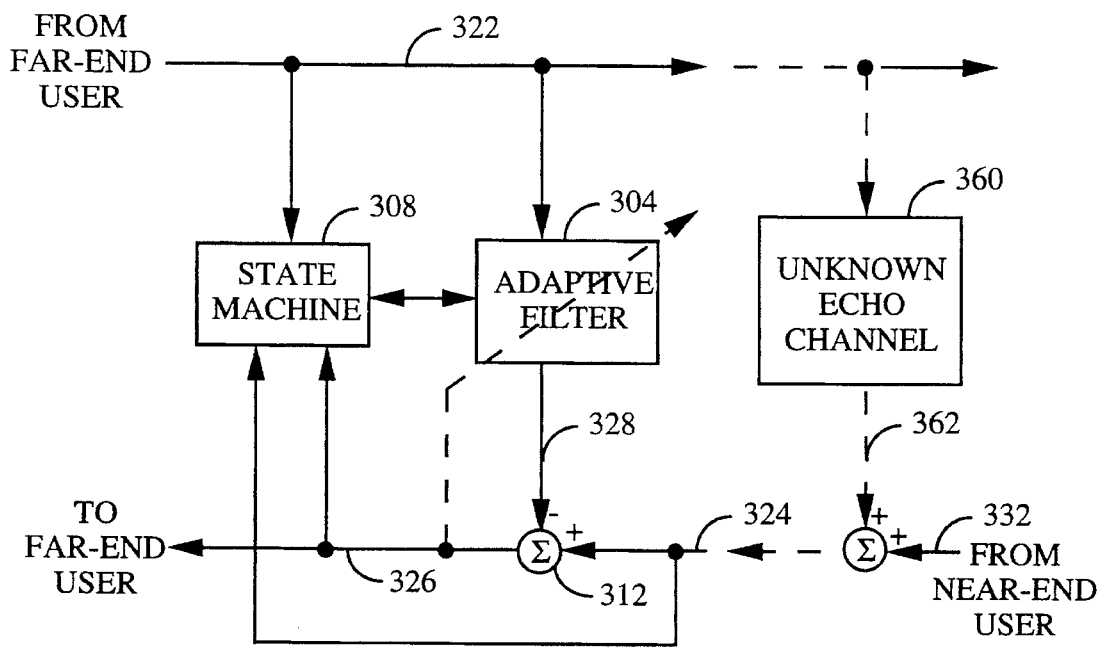
FIG. 3 is a illustrates a time-domain echo canceller.

FIG. 3 is a block diagram illustrating a simple time-domain echo canceller 300. Time-domain echo canceller 300 is comprised of an adaptive filter 304, a state machine 308, and a summing junction 312. Also illustrated in FIG. 3 is an unknown echo channel 360 which represents the source of an undesirable echo signal introduced by a hybrid 122.

An input signal 322 is received from a far-end user at the other end of four-wire segment 164. Input signal 322 can be, for example, the speech signal from a user speaking into cellular phone 204 or telephone instrument 104 at the far end. Input signal 322 can also be modem data or other audio data received from the far end of four-wire segment 164.

In an environment where an impedance mismatch exists, input signal 322 passes through an unknown echo channel 360 to produce echo signal 362. It is echo signal 362 that is mixed with near-end audio 332 (e.g., speech from the local user). The sum of echo signal 362 and the near-end speech 332 comprises a return signal 324. Without echo canceller 300, return signal 324 which includes both near-end audio 332 and echo signal 362, would be fed back to the far-end user. However, the echo canceller uses adaptive filter 304 and summing junction 312 to cancel the effect that echo signal 362 has on return signal 324.

Adaptive filter 304 uses input signal 322 to produce an estimate signal 328 which is an estimate of actual echo signal 362. Estimate signal 328 is subtracted from return signal 324 to produce error signal 326. Error signal 326 is also used by adaptive filter 304 to update its filter taps (also called coefficients) according to some adaptation algorithm such as the least-mean square (LMS) method. In essence, adaptive filter 304 learns the frequency response of unknown echo channel 360 by observing its response to the frequencies received in input signal 322.

State machine 308 controls the operation of adaptive filter 304 by monitoring input signal 322, error signal 326, and return signal 324 to determine when adaptive filter 304 should be updated. Specifically, state machine 308 alters the adaptation step size of adaptive filter 304 to control how quickly it converges. For large adaptation step sizes, adaptive filter 304 adapts to unknown echo channel 360 quickly. However, because of the large step size, small changes in the frequency response of error signal 326 result in large changes to the response of adaptive filter 304.

One important parameter used to determine the convergence of the adaptive filter is the echo return loss enhancement (ERLE). ERLE is defined as $$\text{ERLE(dB)} = 10 \log (\sigma_y^2 / \sigma_e^2)$$

where, $\sigma_y^2$ is the variance of echo signal 362, $\sigma_e^2$ is the variance of error signal 326, and these variances are approximated using short-term energy averages of return signal 324 and the error signal 326 respectively. The ERLE represents the amount of energy that is removed from return signal 324 after it has passed through echo canceller 300. If the ERLE reaches 25–30dB, state machine 308 assumes that adaptive filter 304 has converged; that is, adaptive filter 304 has learned the frequency response of unknown echo channel 360. State machine 308 then reduces the adaptation step size of adaptive filter 304 so that it can approximate unknown echo channel 360 more closely. This change of filter adaptation step size is called gearshifting.

A time-domain filter similar to that illustrated in FIG. 3 that uses ERLE for measuring convergence and detecting doubletalk is fully disclosed in the above-mentioned U.S. Pat. No. 5,307,405, the full disclosure of which is incorporated herein by reference.

As stated above, state machine 308 controls the convergence of adaptive filter 304 by adjusting the adaptation step size of adaptive filter 304. With a large adaptation step size, adaptive filter 304 quickly adapts to the frequency response of unknown echo channel 360. However, if the adaptation step size remains large, variations in the response of echo channel 360 result in gross adaptations in adaptive filter 304. Use of a large adaptation step size can cause the response of unknown adaptive filter 304 to overcompensate for minor variations in unknown echo channel 360 and/or input signal 322. Thus, large adaptation step sizes can be thought of as coarse tuning—small input variations result in a large change in response. This is ideal for quickly getting into the right area, but less than ideal for zeroing in on the target.

To allow fine tuning of adaptive filter 304, a small adaptation step size can be provided. However, when adaptive filter 304 is far from the frequency response of unknown echo channel 360, a small adaptation step size would cause adaptive filter 304 to require an undue amount of time to learn the frequency response of unknown echo channel 360.

Therefore, in an optimum solution, the adaptation step size is initially set to a large size, allowing adaptive filter 304 to quickly converge on the frequency response of unknown echo channel 360. Once adaptive filter 304 has converged, the adaptation step size is decreased to allow adaptive filter 304 to accurately track variations in unknown echo channel 360 and in input signal 322.

However, a problem occurs when using the ERLE as a measure of convergence in the presence of tones. When input signal 322 is a single frequency tone or a pair of tones, adaptive filter 304 quickly learns the channel response of unknown echo channel 360 to these frequencies. At this point, the frequencies are canceled and the ERLE increases to over 30dB. In response, state machine 308 reduces the adaptation step size because it believes that adaptive filter 304 is converged. In reality, adaptive filter 304 has not converged for the entire frequency response of the channel but has only converged for the frequencies of the received tones.

Examples of such tones commonly occurring in telephone calls that can create this false convergence scenario are call-progress tones (such as ringback) and Dual-Tone Multifrequency (DTMF) tones that result from a keypad entry.

With the small adaptation step size resulting from this false convergence, echo canceller 300 is in its steady-state mode of operation. As with actual convergence, when the adaptation step size is small, only fine adjustments to adaptive filter 304 are made. However, the filter has not really converged because it has only learned the channel response to the tone frequencies. Consequently, when the far-end speaker starts to talk, echo signal 362 contains new frequencies that adaptive filter 304 does not cancel, and adaptive filter 304 is slow to learn the channel response to the new frequencies because its adaptation step size is small.

Another problem caused by false convergence is that state machine 308 may incorrectly assume that the speech in return signal 324 is doubletalk. Doubletalk occurs, for example, when both parties are talking and both near-end speech 332 and echo signal 362 contain voice signals. In some implementations, state machine 308 may be programmed to accommodate doubletalk by disabling adaptation of adaptive filter 304.

4. Filter Tap Frequency Comparator

To prevent tones from creating the false-convergence condition described above, a filter tap frequency comparator circuit is provided. The filter tap frequency comparator circuit is implemented in conjunction with echo canceller 300 and used in conjunction with the ERLE calculation described above. The filter tap frequency comparator circuit examines the spectral content of the tap values of adaptive filter 304 and determines whether the conditions that result in false convergence have been present.

Figure 4:
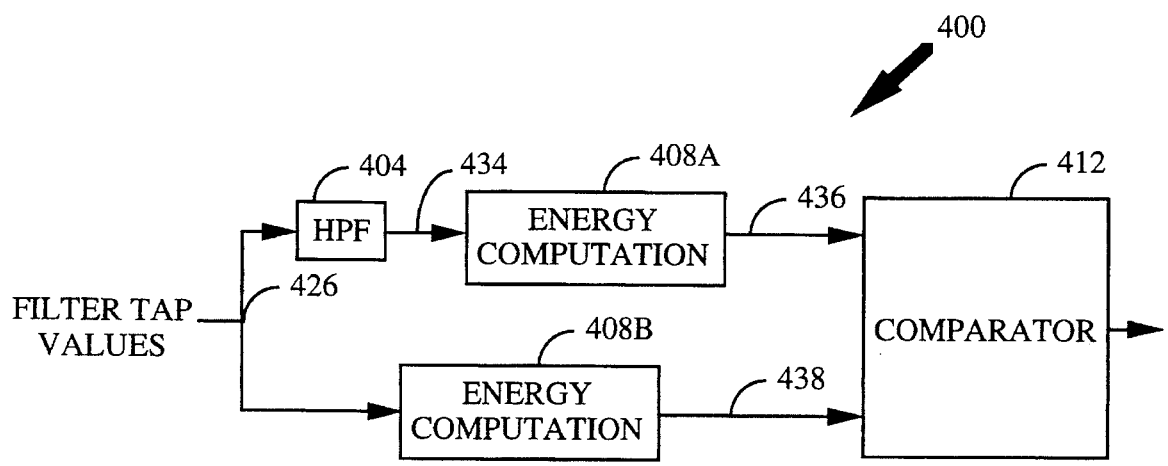
FIG. 4 is a illustrates a filter tap comparator circuit.

FIG. 4 is a block diagram illustrating one embodiment of a filter tap frequency comparator 400 according to the invention. In this embodiment, filter tap frequency comparator 400 is comprised of a high pass filter (HPF) 404, energy computation circuits 408A and 408B, and a comparator 412. Filter tap frequency comparator 400 is located within state machine 308 in the preferred embodiment.

Figure 5:
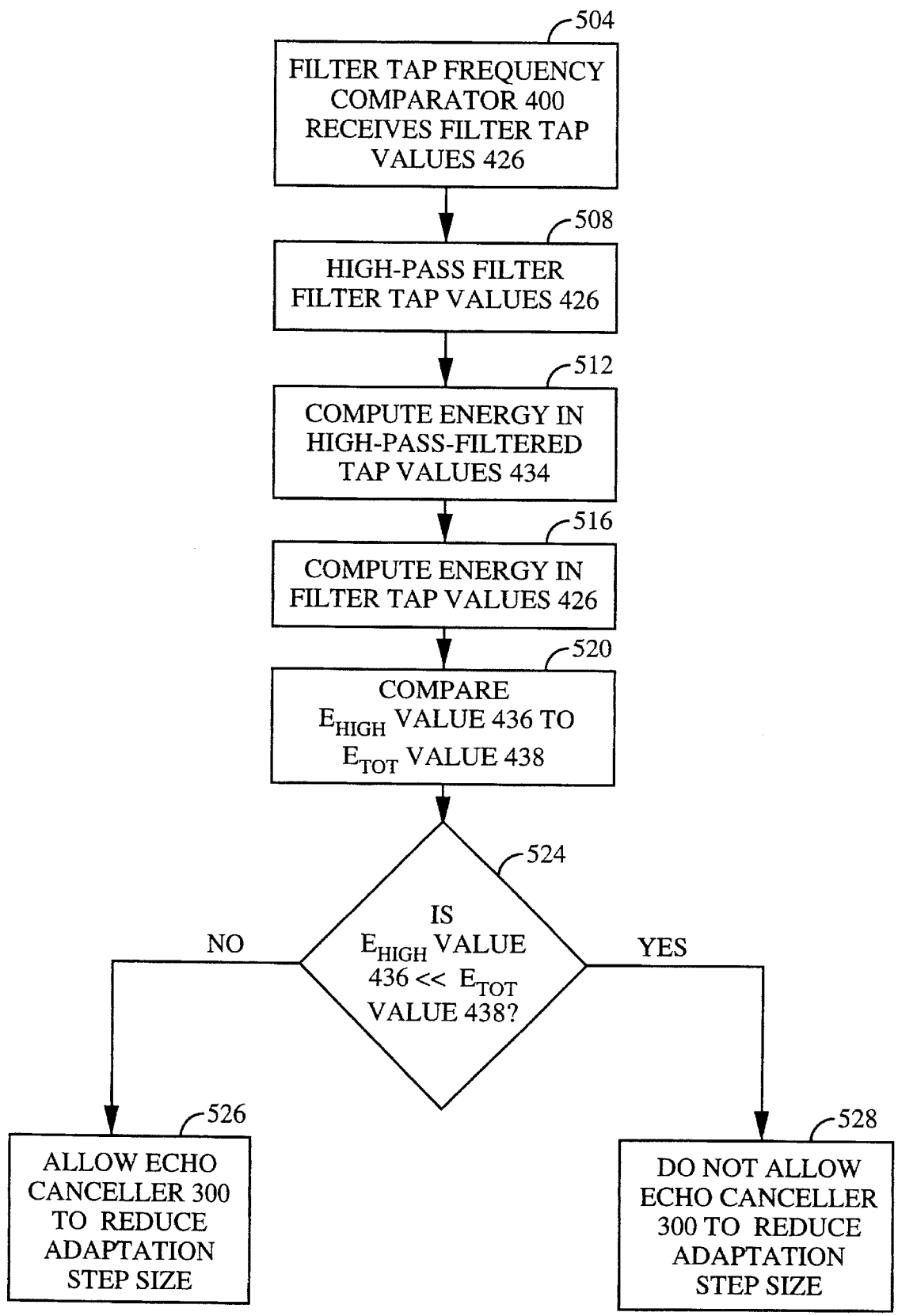
FIG. 5 is an operational flow diagram illustrating the operation of the filter tap comparator circuit.

The operation of filter tap frequency comparator 400 is now generally described. FIG. 5 is an operational flow diagram illustrating the process followed by filter tap frequency comparator 400 in detecting false convergence.

Referring now to FIGS. 4 and 5, in a step 504, filter tap frequency comparator 400 receives filter tap values 426 which are an array of values corresponding to a set of frequencies derived using error signal 326 and input signal 322 as described above. In a step 508, the filter tap values 426 are high-pass filtered to attenuate the energy in frequencies below a desired cutoff frequency. The cutoff frequency is selected so that high pass filter 404 blocks the frequencies corresponding to tones but passes the other signal frequencies greater than the highest tone frequency. Thus, the frequencies passed by high pass filter 404 correspond to those frequencies other than tone frequencies. The filtering process is effective because the tone frequencies typically occur on the bottom end of the audio frequency spectrum. The result is a second set of filter taps referred to as high-pass-filtered tap values 434.

For example, in a typical telephone system, the audio spectrum ranges from 0 to 4 kHz and the tones all occur near or below 2 kHz. In such an environment, the cutoff frequency of high pass filter 404 is set at 2 kHz. In this embodiment, only frequencies from 2–4 kHz are passed.

In a step 512, the energy in high-pass-filtered tap values 434 is computed by energy computation device 408A to produce the $E_{HIGH}$ value 436. $E_{HIGH}$ value 436 represents the amount of energy in high-pass-filtered tap values 434. In a preferred embodiment, $E_{HIGH}$ value 436 is computed by computing the sum of the squares of the high-pass-filtered filter tap values 434.

Similarly, in a step 516, the energy in filter tap values 426 is computed by energy computation device 408B. Energy computation device 408B produces $E_{TOT}$ value 438 which represents the energy in filter taps values 426 across the entire audio frequency band of the communications system. In a preferred embodiment, $E_{TOT}$ value 438 is computed by computing the sum of the squares of filter tap values 426.

In a step 520, $E_{HIGH}$ value 436 is compared to $E_{TOT}$ value 438 to determine if adaptive filter 304 is actually converged (or if adaptive filter 304 can truly converge), or if the presence of the tones has resulted in conditions under which the false convergence problem can occur. If input signal 322 has been only composed of tones, all of the energy in filter tap values 426 is below the cutoff frequency of high pass filter 404. Therefore, if $E_{HIGH}$ value 436 is a small fraction of the total tap energy $E_{TOT}$ value 438, this is an indication that input signal 322 has been composed only of tones. In this way the spectral content of filter tap values 426 is used to detect the recent presence of tones on input signal 322.

If the presence of tones is detected, state machine 308 does not allow echo canceller 300 to reduce its adaptation step size. If, on the other hand, input signal 322 is not composed of tones (i.e., $E_{HIGH}$ value 436 is more than just a small fraction of $E_{TOT}$ value 438), echo canceller 300 is allowed to gearshift its step size to a smaller value as illustrated by decision block 524 and steps 526, 528. For example, in one embodiment, if $E_{HIGH}$ value 436 is more than 15% of $E_{TOT}$ value 438, the canceller is allowed to gearshift.

In one embodiment, comparator 412 simply determines whether the ratio of $E_{HIGH}$ value 436/$E_{TOT}$ value 438 is above a determined threshold. If so, echo canceller 300 is allowed to enter the steady state. Selection of the threshold level, cutoff frequency and other operation parameters depends on the environment in which the invention is implemented. Factors affecting the operating parameters can include the strength, duration, and frequencies of the possible tones. Additional factors can include the type, level, and frequency range of audio data expected in the input signal (e.g. the voice of far-end speaker).

In the embodiment described above, the filter tap frequency comparator observes the frequency response of the filter taps to determine whether the echo canceller should be allowed to reduce its adaptation step size. In an alternative embodiment, a frequency comparator circuit observes the input signal to determine whether it is composed of only tones.

There are numerous implementations for filter tap frequency comparator 400. For example, instead of high-pass filtering one signal path, one could low-pass filter the signal and determine the relationship between $E_{LOW}$ and $E_{TOT}$.

Additionally, there are numerous implementations for comparator 412. In one embodiment, comparator 412 is a simple comparator circuit that looks at the ratio of $E_{HIGH}$ value 436 to $E_{TOT}$ value 438. In more complex implementations, comparator 412 can be implemented using a processor to determine the ratio of $E_{HIGH}$ value 436 to $E_{TOT}$ value 438 and to determine whether the threshold has been exceeded. This implementation is ideal where state machine 308 is implemented using a processor because the same processor can be used to implement comparator 412.

Fundamental to a system like the present invention is the use of various information storage devices, often referred to as "memory", which store information via the placement and organization of atomic or super-atomic charged particles on hard disk media or within silicon, gallium arsenic, or other semiconductor based integrated circuit media, and the use of various information processing devices, often referred to as "microprocessors," which alter their condition and state in response to such electrical and electromagnetic signals and charges. Memory and microprocessors that store and process light energy or particles having special optical characteristic, or a combination thereof, are also contemplated and use thereof is consistent with the operation of the described invention. For example in a preferred embodiment, filter tap frequency comparator 400, including comparator 412, may be implemented using a digital signal processor (DSP) chip. Additionally, in this preferred embodiment, state machine 308 and adaptive filter 304 may be implemented with the same DSP chip. Note that the functional architecture of the above-described DSP embodiment can be represented by echo canceller 300 illustrated in FIG. 3, with filter tap frequency comparator 400 being implemented as a part of state machine 308.

A variety of alternative embodiments and implementations of this invention are envisioned. For example, in a more complex scheme a Fast Fourier Transform (FFT) may be used to find the frequency response of the filter tap values. Or, the comparison of two bands in the present invention may be extended and more than two different frequency bands may be examined. More simply in an alternative embodiment, the high-pass filter may be replace with a low- or band-pass filter. In yet another alternative embodiment which may be used in combination with most of the previously expressed alternative embodiments, the state machine may increase the step size of the adaptive filter process after reducing the step size instead of prohibiting the reduction as described above.

5. Conclusion

While various embodiments of the present invention have been described above, it should be understood that they have been presented by way of example only, and not limitation. Various modifications to these embodiments will be readily apparent to those skilled in the art, and the generic principles defined herein may be applied to other embodiments without the use of the inventive faculty. The breadth and scope of the present invention should not be limited by any of the above-described exemplary embodiments, but should be defined only in accordance with the following claims and their equivalents.

I claim:

1. A system for inhibiting false convergence in an echo canceller having an adaptive filter with an adaptation step size controlled to allow the adaptive filter to converge on an input signal, comprising:

means for determining whether the input signal received by the echo canceller contains only tones; and means for preventing the echo canceller from reducing the adaptation step size of the adaptive filter if the input signal contains only tones.

2. The system of claim 1, wherein said means for determining comprises:

filter means for filtering a filter tap signal to produce a filtered signal;

first energy determination means for determining an amount of energy in said filtered signal;

second energy determination means for determining an amount of energy in an unfiltered filter tap signal; and comparison means for comparing said amount of energy in said filtered signal with said amount of energy in said unfiltered filter tap signal to determine whether the input signal contains only tones.

3. The system of claim 2, wherein said comparison means comprises means for indicating that the input signal contains only tones if said amount of energy in said filtered signal is much less than said amount of energy in said unfiltered filter tap signal.

4. The system of claim 2, wherein said comparison means comprises means for indicating that the input signal contains only tones if said amount of energy in said filtered signal differs greatly from said amount of energy in said unfiltered filter tap signal.

5. An echo canceller for canceling an unwanted echo signal from a return signal to produce an error signal being sent to a first user, comprising:

adaptive filter means for estimating a frequency response of an unknown echo channel to produce an estimate of said echo signal, said estimate produced using an input signal received by said echo canceller from a first user;

means for subtracting said estimate of the echo signal from said return signal to produce said error signal; and control means for monitoring said return signal, said input signal and said error signal to control an adaptation step size of said adaptive filter means, said control means having means for determining whether the input signal of said adaptive filter means contain only tones, and means for inhibiting a reduction in said adaptation step size of said adaptive filter if said input signal contains only tones.

6. The echo canceller of claim 5, wherein said means for determining comprises:

filter means for filtering a set of filter taps of said adaptive filter means to produce a filtered signal;

first energy determination means for determining an amount of energy in said filtered signal;

second energy determination means for determining an amount of energy in said set of filter taps; and comparison means for comparing said amount of energy in said filtered signal with said amount of energy in said set of filter taps to determine whether said input signal contains only tones.

7. The echo canceller of claim 6, wherein said filter means is a high-pass filter and said comparison means comprises means for indicating that said input signal contains only tones if said amount of energy in said set of filter taps is much greater than said amount of energy in said filtered signal.

8. In an echo canceller for canceling from a return signal an echo signal produced by an echo channel where the echo canceller has an adaptive filter for estimating a frequency response of the echo channel to produce an estimate of the echo signal and a means for subtracting the estimate of the echo signal from the return signal, a method for inhibiting false convergence in the echo canceller, the method comprising the steps of:

filtering filter taps of the adaptive filter to produce a filtered signal;

determining an amount of energy in the filtered signal;

determining an amount of energy in the filter taps;

comparing the amount of energy in the filtered signal with the amount of energy in the filter taps to determine whether the input signal contains only tones; and preventing the inclusion in the input signal of only one or more tones from causing subsequent false convergence of the echo canceller.

9. The method of claim 8, wherein said step of filtering comprises a step of high-pass filtering the filter taps, and wherein said step of preventing comprises the step of preventing an adaptation step size of the adaptive filter from being reduced if said amount of energy in the filter taps is much greater than said amount of energy in said filtered signal.

10. In an echo canceller for canceling from a return signal an echo signal produced by an echo channel where the echo canceller has an adaptive filter for estimating a frequency response of the echo channel to produce an estimate of the echo signal and a means for subtracting the estimate of the echo signal from the return signal, a method for inhibiting false convergence in the echo canceller, the method comprising the steps of:

filtering filter taps of said adaptive filter to produce a filtered signal;

determining an amount of energy in said filtered signal;

determining an amount of energy in said filter taps;

comparing said amount of energy in said filtered signal with said amount of energy in said filter taps to estimate whether an input signal to said adaptive filter contains only tones; and preventing reduction of an adaptation step size of said adaptive filter if said step of comparing determines that said input signal contains only tones.

11. The method of claim 10, wherein said step of filtering comprises the step of high-pass filtering filter taps.

12. A system for avoiding false convergence in an echo canceller having an adaptive filter with an adaptation step size controlled to allow a set of filter tap values to converge to estimate a response of a channel over an operation frequency range, comprising:

means for determining a spectral content of said set of filter tap values; and means for controlling said adaptation step size of said adaptive filter in response to said spectral content of said set of filter tap values.

13. The system of claim 12 wherein said means for determining the spectral content is a Fast Fourier Transform.

14. The system of claim 12 wherein said means for determining the spectral content comprises:

first filter means for determining an energy in said set of filter tap values corresponding to a limited frequency range wherein said limited frequency range is a subset of said operation frequency range;

means for determining an energy in said set of filter tap values in said operation frequency range; and means for comparing said energy corresponding to said limited frequency range to said energy corresponding to said operation frequency range.

15. The system of claim 14 wherein said first filter means is a high pass filter and said limited frequency range corresponds to frequencies above a predetermined cutoff frequency.

16. The system of claim 14 wherein said first filter means is a band pass filter and said limited frequency range corresponds to frequencies between a lower cutoff frequency and an upper cutoff frequency.

17. The system of claim 14 wherein said first filter means is a low pass filter and said limited frequency range corresponds to frequencies below a predetermined cutoff frequency.

18. The system of claim 12 wherein said means for determining said spectral content comprises means for determining whether said set of filter tap values indicates a presence of exclusively tone frequencies on said channel.

19. The system of claim 12 wherein said means for controlling said adaptation step size comprises means for preventing a reduction in said adaptation step size if said spectral content indicates a condition which may cause false convergence.

20. The system of claim 12 wherein said means for controlling said adaptation step size comprises means for allowing a reduction in said adaptation step size if said spectral content indicates a condition which may cause false convergence and means for allowing an increase in said adaptation step size when said spectral content no longer indicates said presence of said condition which may cause false convergence.

21. An echo canceller for canceling in a return channel an echoed receive channel signal to produce a compensated return channel signal wherein said echoed receive channel signal is combined by an echo channel with an input return channel signal to produce an uncompensated return channel signal, said echo canceller comprising:

an adaptive filter having a first and second output and having a first input coupled to a receive channel signal and a second input coupled to said compensated return channel signal, said adaptive filter having a set of tap values which dynamically adapt to said echoed receive channel signal, wherein said first output provides an estimate of said echoed receive channel signal and said second output provides said set of tap values;

a summer having an output and having a first input coupled to said first output of said adaptive filter and a second input coupled to said uncompensated return channel signal, said output of said summer producing said compensated return channel signal; and a filter tap comparison circuit having an input coupled to said second output of said adaptive filter receiving said set of tap values and an output coupled to said adaptive filter for controlling a rate at which said set of tap values dynamically adapt to said echoed receive channel signal.

22. A method for avoiding false convergence in an echo canceller having an adaptive filter with an adaptation step size controlled to allow a set of filter tap values to converge to estimate a response of a channel over an operation frequency range, comprising the steps of:

determining a spectral content of said set of filter tap values; and controlling said adaptation step size of said adaptive filter in response to said spectral content of said set of filter tap values.

* * * * *